United States Patent [19]
Gustafsson

[11] 4,363,730
[45] Dec. 14, 1982

[54] LAMELLAR SEPARATOR

[75] Inventor: Berth U. Gustafsson, Österskär, Sweden

[73] Assignee: Projectus Industriprodukter AB, Sweden

[21] Appl. No.: 269,049

[22] PCT Filed: Oct. 1, 1980

[86] PCT No.: PCT/SE80/00233

§ 371 Date: May 28, 1981

§ 102(e) Date: May 28, 1981

[87] PCT Pub. No.: WO81/01108

PCT Pub. Date: Apr. 30, 1981

[30] Foreign Application Priority Data

Oct. 18, 1979 [SE] Sweden ............................... 7908653
Dec. 11, 1979 [SE] Sweden ............................... 7910208

[51] Int. Cl.³ .............................................. B01D 21/00
[52] U.S. Cl. ..................................... 210/521; 55/440
[58] Field of Search ............... 210/521, 522, 388, 384, 210/802; 55/440

[56] References Cited

U.S. PATENT DOCUMENTS 344,740 6/1886 Howatson ........................... 210/534
3,385,439 5/1968 Bach .................................. 210/522
3,454,165 7/1969 Cornelissen ........................ 210/522

FOREIGN PATENT DOCUMENTS 2715049 10/1978 Fed. Rep. of Germany .
1009154 5/1952 France .
1255641 12/1971 United Kingdom .

Primary Examiner—Benoit Castel
Assistant Examiner—Sharon T. Cohen
Attorney, Agent, or Firm—Burns, Doane, Swecker & Mathis,

[57] ABSTRACT

A lamellar separator includes a lamellar pack which is formed from vertically oriented first plates (1) having a first corrugation in the vertical plane, where the lamellae (10,11) of said plate inclined to the vertical plane form vertical boundaries for substantially horizontal flow channels, and vertically oriented second plates (2) corrugated in the horizontal plane, arranged on either side of each first plate and in contact therewith. The flow channels are defined horizontally by the corrugation peaks of the second plates, and the vertical rise and fall channels for separate pollutants are defined by the second plates (2) and the corrugation peaks (22) of the first plates. The corrugations (1,2) of the first plates are preferably triangular. The first plates (1) and the second plates (2) are preferably put together such that the corrugation peaks (12) of the first plate lie behind the corrugation peaks (22) of the second plate (2).

10 Claims, 6 Drawing Figures

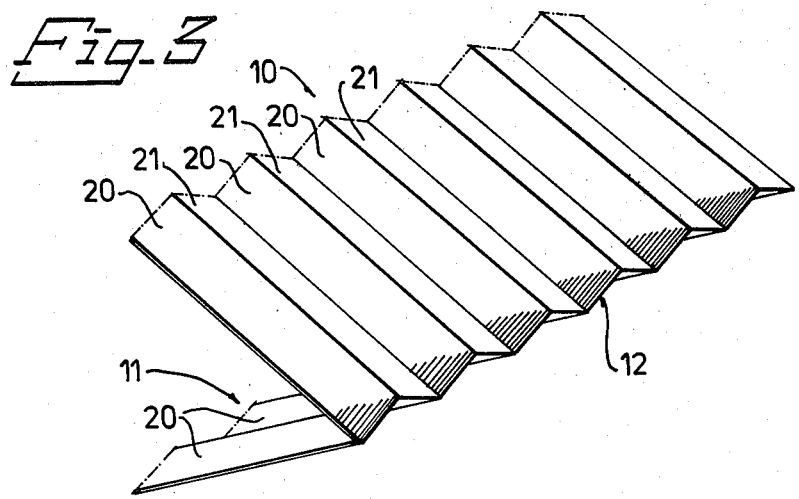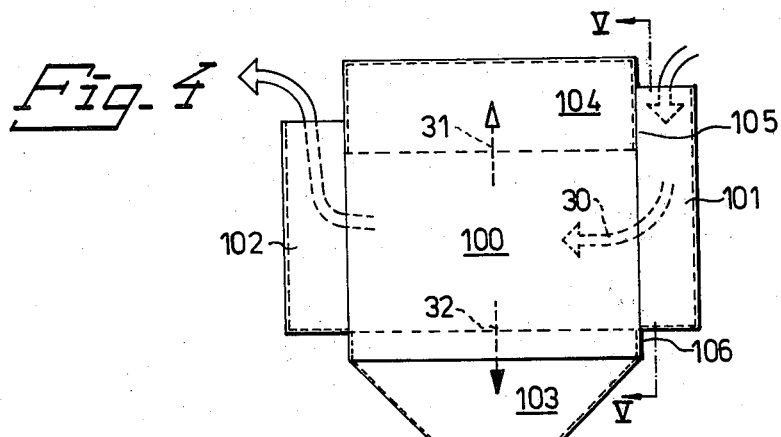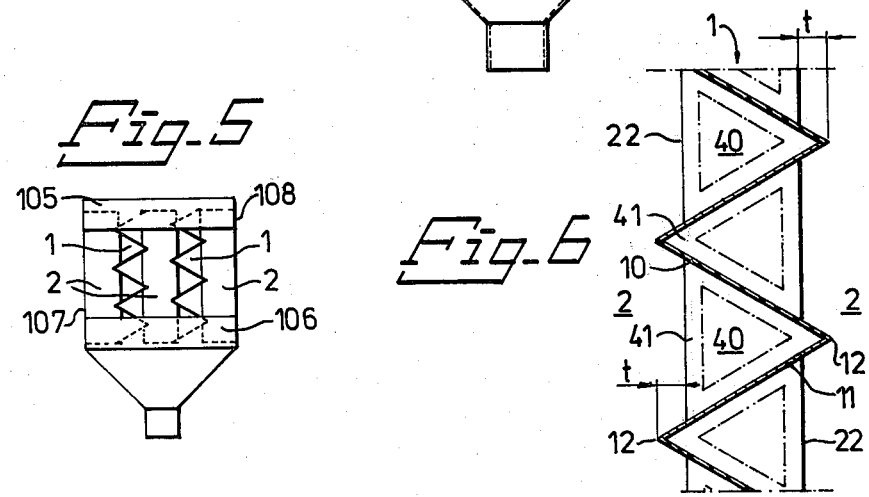

LAMELLAR SEPARATOR

TECHNICAL FIELD

The invention relates to a lamellar separator comprising elongate substantially planar lammelae extending substantially horizontally in their longitudinal direction, for vertically separating substantially horizontal flow passages for a liquid which is to be purified, said passages being inclined to the horizontal plane in their transverse direction, for gravitational removal from the lamellae of heavy and/or light pollutants separated from the liquid.

BACKGROUND ART

In lamellar separators, a main flow is taken in a path between lamellae, whereon suspended particles gravitationally separated from the main flow, as well as miscible liquids, are collected in the boundary layer adjacent the lamellar surfaces, from where they can slide away gravitationally from the lamellae without being essentially disturbed by the main flow. If the lamellae have substantial length in their inclined direction, there is a risk that the separated material in the boundary layer assumes such thickness that the main flow is disturbed, or that the latter once again entrains material from the boundary layer.

One ambition will therefore be to arrange the lamellae with small extension in the direction of inclination, simultaneously as the inclination is sufficiently large so that material transport in the boundary layer in the direction of inclination will be relatively rapid, while the vertical distance between adjacent lamellae will be as small as possible to minimize the length of the flow passages.

This would however result in that the lamellar stack obtained a very small width and large height, alternatively that the required lamellar pack must be formed from a plurality of such stacks, whereby baffle elements would need to be inserted between the stacks to prevent undesired flow patterns. Examples of such modus operandi are illustrated in the Swedish published application No. 7101307-2.

It will be understood, however, that in such apparatus it is not possible to afford vertical channels, which are difficult to disturb, for both light and heavy material which has left the lamellae, or alternatively that it would not be possible to prevent through flow between adjacent lamellar packs.

It is furthermore a known situation that lamellar packs for lamellar separators tend to get a very complicated structure, if subdivision of the flow paths into a plurality of parallel paths with small area is striven after.

PURPOSE

One purpose of the invention is, therefore, to propose a lamellar separator eliminating or reducing the disadvantages which are associated with structures already known. An object is thus to propose a lamellar pack with a structural fabrication which is very simple, and allows the simple manufacture of the elements incorporated as well as simple assembly of the elements to a finished pack. The invention furthermore has the object of providing a lamellar separator in which the tendency of separated material to collect on the lamellar surfaces is avoided, and which affords undisturbed vertical passages or channels for light and heavy separated pollutants.

SUMMARY OF THE INVENTION

The inventive lamellar separator includes a lamellar pack comprising elongate substantially planar lamellae extending substantially horizontally in their longitudinal direction for vertically defining substantially horizontal flow passages or channels for a liquid which is to be cleaned. The flow passages are inclined to the horizontal plane in their transverse direction for gravitational removal from the lamellae of heavy and/or light pollutants separated from the liquid. Distinguishing for the invention is that there are vertically oriented first sheets or plates made with a first corrugation in the vertical plane, the portions thereof which are oblique to the vertical plane form said lamellae. Vertically oriented second sheets or plates corrugated in the horizontal plane are disposed on either side of each first plate and in contact therewith.

In a preferred embodiment, the first and second plates are put together such that the corrugation peaks on each first plate are behind the corrugation peaks on the second plates and vice versa. According to a further development of the invention, the first plate can have a second corrugation extending substantially perpendicular to the first corrugation, the second corrugation then having lower height and preferably shorter pitch than the first corrugation. The second corrugation of the first plate can be origamically folded at the peaks of the first corrugation.

The separator can be made such that the first corrugation of the first plate has a width which is substantially equal to the pitch, the lamellar surfaces having, for example, a slope of 60° to the vertical plane.

The corrugation on the second plate can have a width or depth which is substantially equal to the pitch. The width and pitch of the corrugation on the second plate preferably being equal to the width and pitch of the first corrugation on the first plate.

In a preferred embodiment of the invention, the corrugation of the first plate can have a pitch of 3 to 50 mm, preferably about 8 mm, and the second corrugation of the first plate can have a pitch attaining to about 1/5 of the pitch of the first corrugation.

The inventive lamellar separator will have special use in the separation of metal carbide particles as well as oil and grease from cutting liquids. In such a case it can be suitable to allow the corrugation of the first plate to have a pitch of the order of magnitude of 8 mm to allow minimization of the lamellar pack size, taking into account the metal carbide particles which are present in machining metal carbide objects or machining with the aid of metal carbide tools.

If it is assumed that the first corrugation on the first plate has a pitch of 8 mm, that the main flow passages have a length of 300 mm and that the active flow passage area of the lamellar pack is 7.5 dm$^2$, metal carbide particles with a size of 5$\mu$ can be separated at a flow of 11 liters per minute. If the pitch of the corrugation on the first plate is 3 mm instead, metal carbide particles with a size of 2$\mu$ can be separated at a flow of hardly 5 liters per minute.

Use will naturally also be found for the invention for other purposes than purifying cutting liquid containing metal carbide particles. It should thus be quite clear that the invention is also to the purpose for treating waste water of a general kind, and that a prominent feature of the invention is that it allows a limited volume for the lamellar pack, while simultaneously enabling simple production of the separate elements in the lamellar pack, as well as enabling simple assembly of the elements into said pack. Due to the orthogonal embodiment and vertical orientation of the lamellar pack it allows simplified installation thereof in a liquid container, which can thus also have orthogonal configuration.

The invention is defined in the appended patent claims, and will be described in detail in the following in the form of an example, with reference to the appended drawing.

BRIEF DESCRIPTION OF DRAWINGS

FIG. 3 is a detail of a first corrugated plate incorporated in the lamellar separator.

FIG. 4 is a schematic view of a lamellar separator in which a lamellar pack according to FIGS. 1 to 3 can be incorporated.

FIG. 5 is a schematic section taken along the line 5—5 in FIG. 4.

FIG. 6 illustrates the boundary layer of the lamellar pack in a schematic vertical section transverse to the first plates.

DETAILED DESCRIPTION OF THE PREFERRED EMBODIMENT

Figure 1:
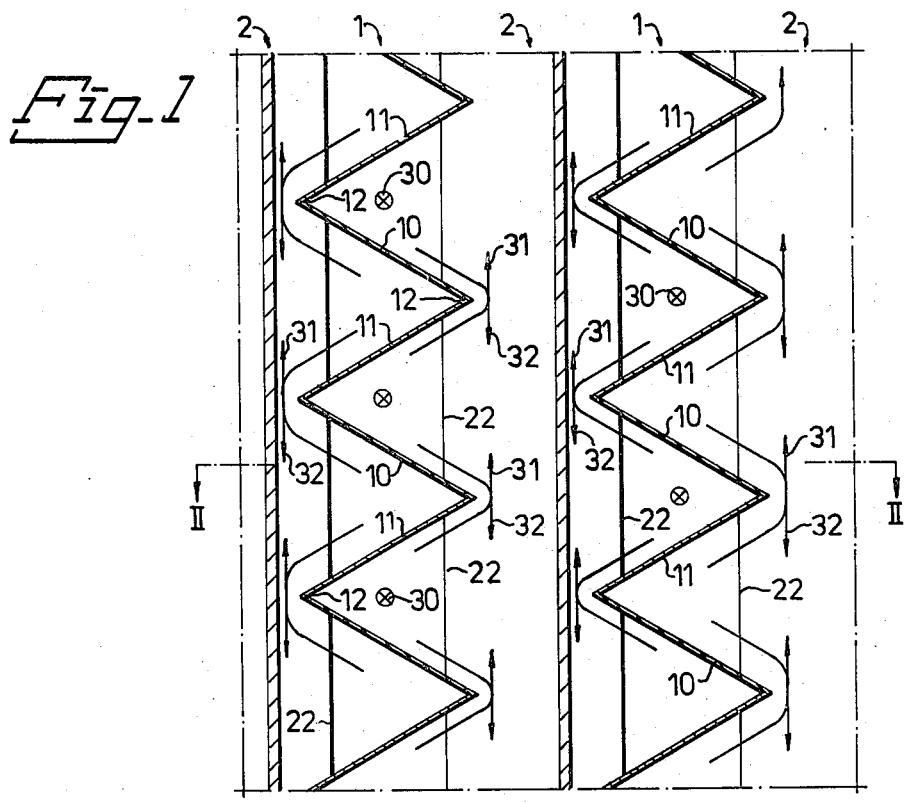
FIG. 1 is a vertical section through a lamellar pack incorporated in the lamellar separator in accordance with the invention.
Figure 2:
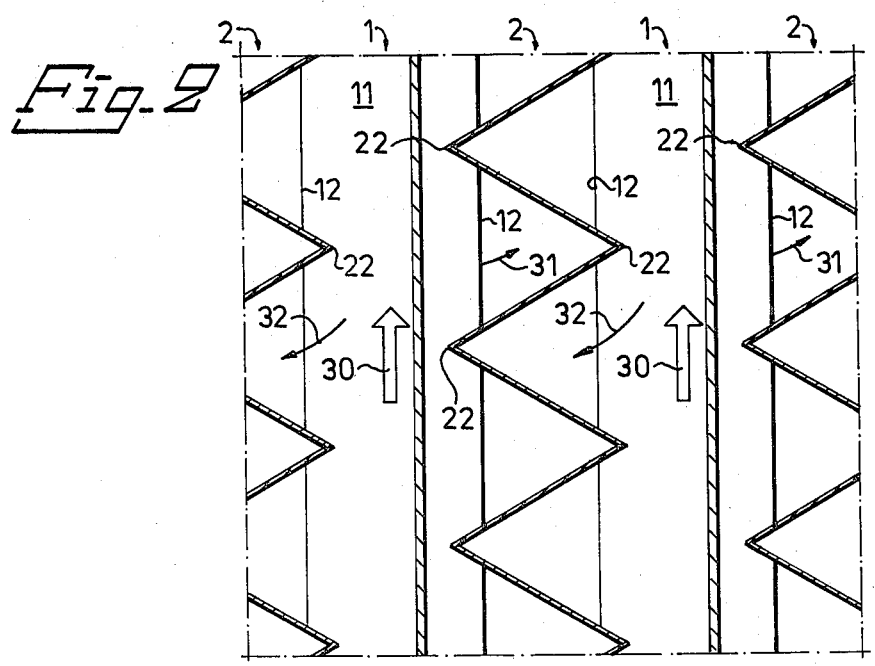
FIG. 2 is a horizontal section taken along the line 2—2 in FIG. 1.

With reference to FIG. 4, a lamellar separator includes an orthogonal lamellar pack 100, arranged in a vessel the lower portion 103 of which receives separated heavy material and the upper portion 104 receives separated light material. An inlet hopper 101 leads a flow 30 of the liquid to be cleaned horizontally through a lamellar pack 100. An outlet chamber 102 takes the flow 30 from the lamellar pack 100 and the container. The lamellar pack 100 is formed from corrugated plates 1 and 2 with the corrugations alternatingly on the cross and with orthogonal configuration, the resulting lamellar pack 100 also being orthogonal in its construction, for being accommodated in an orthogonal container. The inlet of the pack is restricted vertically by upper and lower baffle plates 105 and 106, respectively (see FIG. 5), and the side plates 107 and 108 of the container can adjoin tightly to the outer plates 2 of the lamellar pack. The pack 100 is shown in detail in FIGS. 1 and 2. FIG. 1 is a vertical section parallel to a plane normal to the flow direction of the main flow 30. FIG. 2 is a section taken along the line 2—2 in FIG. 1.

The lamellar pack comprises corrugated plates 1 and 2 arranged alternately with the main corrugation of the plates 1 in the vertical plane and the corrugation of the plates 2 is in the horizontal plane. The corrugated surfaces 10, 11 of the plates 1 form vertical boundaries to the flow passages for the main flow 30, while the corrugation peaks 22 of the plates 2 form a restriction of these flow passages in the horizontal direction. The main flow is subdivided into a plurality of partial flows 30, each being led through a horizontally directed channel defined by the peaks 22 of the plate 2 and the corrugation surfaces or lamellae 10, 11 of the plate 1. In the preferred embodiment, illustrated in FIGS. 1 and 2, the plates 1 and 2 are adapted for meshing with each other so that the peaks 12 of the plates 1 lie behind the plane through the peaks 22 of the plates 2. Light pollutants in the flow 30 will rise towards the underside of the adjacent lamella 10 or 11, there to come into the boundary layer of the lamellar surface and subsequently glide upwards along the lamellar surface 10 or 11, by degrees to leave the lamella at the corrugation peak 12, where the light pollutant flow 31 has departed from the effective through-flow cross section by a good margin. In a corresponding mode, heavy pollutants in the flow 30 will gravitate down towards the adjacent lamella 10 or 11 to come into the boundary layer closest to said lamellar surface, glide down by gravity along it and out to the corrugation peaks 12, where the flow 32 of heavy pollutants leaves the respective lamella 10,11 at a substantial distance from the main flow 30. The corrugation surfaces of the plates 2 and the corrugation edges 12 of the plates 1 define vertical rise and fall channels for the separated pollutant flows 31 and 32, respectively. Since both these flows 31,32 are by definition hydrophobic, no reblending of the flows 31,32 ought to occur.

FIG. 3 illustrates a detail of a plate 1. In FIG. 1 can be seen the lamellae 10 and 11 of the plate 1 and the corrugation peaks 12 between the lamellae 10 and 11. It is clearly apparent that the plate 1 has been given a second corrugation, which is here illustrated as a zigzag corrugation comprising the lamellar surfaces 20, 21. The corrugation peaks 12 of the plate 1 are formed origamically, so that the valleys between the surfaces 20,21 of the second corrugation on the first lamella 10 will lie horizontally further out than the peaks between the surfaces 20,21 on the lamella 10. As a result of the origamic folding, the flow of light pollutants, which streams upwards on the underside of the lamella 11 in a channel defined by the surfaces 20,21 of the second corrugation, will lie displaced both in the direction of the edge 12 and in the horizontal direction from the flow of heavy pollutants which flow downwards along the lamella 10 in the valley between the surfaces 20,21 of the second corrugation. There is thus afforded a further possibility of keeping the flows 31,32 in the vertical channels separate from each other.

FIG. 6 is a schematic fragment of FIG. 1, where it is apparant that each horizontal flow channel is given an effective cross section 40 surrounded by a boundary layer 41 defined by the lamellar surfaces 10,11 and the corrugation peak 22 of the plate 2. Since plates 1 and 2 further mesh with each other by a distance t, a safety margin is hereby defined so that the distance between the flow 40 inside the boundary layer 41 and the plane through the corrugation peaks 12 of the first plates will be sufficiently large so that disturbances in the flow along the path 40 are hardly likely to affect the rise and fall flows 31 and 32 in the vertical channels. The distance t between the plane through the tops 12 of the first plates and the tops 22 of the second plates is to advantage of the same order of magnitude as the thickness of the boundary layer 41.

To advantage, the plates 1,2 can be made from compression moulded plastics sheets with a thickness of 0.1 mm, for example.

Furthermore, the lamellar pack 100 can be provided with a vibrator acting vertically, with a vibrational amplitude which is less, preferably considerably less, than the pitch between the corrugation peaks on the first plate. By "pitch" is intended the distance between adjacent similarly directed corrugation peaks on a plate.

Certain sedimented substances, e.g. grinding particles can be given a certain structural strength—a kind of increase in viscosity, due to the inner friction between the particles—when the particles are stacked on top of each other. This can result in a deposit on the lower surfaces of the lamellar channels, which by degrees blocks the passages. Such clogging can be prevented by a lamellar pack being given a reciprocating vertical movement by vibration. The lamellae then move relative to the liquid and a displacement occurs in the vertical direction. The liquid is forced to flow over the tips of the horizontal lamellae. The speed and amplitude of the movement can be adjusted so that a desired entrainment of sedimented substance occurs.

The movement must be adjusted so that sedimented particles do not whirl up into suspension again—the result shall be that the particles by the movement are taken out into the lamellar profiles of the vertical channels where they can sink freely.

In separating light substances, e.g. mineral oils in water, a lamellar pack in accordance with the above is very effective. Oil collects in the upper portions of the horizontal flow channels. The vertical movement facilitates the attachment of small oil droplets to larger ones, which more easily ease away from the horizontal fold and rise up to the vertical channels.

When separating oil in water, a vertical transport of large and small oil drops is easily obtained. The oil content can be very high at a high point in a vertical channel for a certain volume, but in spite of this there is rather a lot of water present. During the oscillating movement of the lamellar pack, the speed at which the water content in the oil layer sinks down through the oil layer is increased. The result is thus a decreased water content in the separated oil.

Especially when machining cast iron and cast steel, the cutting and cleaning emulsions get their emulsified oil saturated with small steel residues to such an extent that the specific weight of the polluted oil rises towards 1. When the oil then separates from the emulsion, and small drops gather together into larger ones, the steel particles entrained by the oil can be repulsed. In the lamellar pack described here, the heavy particles can sediment freely without stopping up the channels.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A lamellar separator containing a lamellar pack comprising elongate, substantially planar lamellae extending substantially horizontally for vertically defining substantially horizontal flow passages or channels for a liquid which is to be purified, said flow passages in their transverse direction being inclined to the horizontal plane for gravitational removal from the lamellae of heavy and/or light pollutants separated from the liquid, said separator including an inlet, a liquid outlet and at least one outlet for separated material, said lamellar pack including vertically oriented first sheets or plates having a first corrugation in the vertical plane, portions of the first plates inclined to the vertical plane of said plates forming said flow passages, said lamellar pack further including vertically oriented second plates corrugated in the horizontal plane, said second plates being disposed on either side of each first plate and being in contact therewith whereby the liquid flow is subdivided into a plurality of partial flows each passing through the horizontal flow passages defined by peaks of the second plates and corrugation surfaces of the first plates.

2. Lamellar separator as claimed in claim 1, wherein each of the first plates has a second corrugation extending substantially at right angles to the first corrugation, the second corrugation having less height and shorter pitch than the first corrugation.

3. Lamellar separator as claimed in claim 2, wherein the first corrugation of the first plates has a substantially triangular form, the second corrugation of the first plates is origamically folded at the peaks of the first corrugation.

4. A lamellar separator as claimed in claim 1, wherein the first and second plates are arranged such that corrugation peaks of the first plates lie behind corrugation peaks of an adjacent second plate.

5. A lamellar separator as claimed in claim 4, wherein the corrugation peaks of the first and second plates lie behind each other by a distance corresponding to the thickness of the boundary layer in the flow passages.

6. A lamellar separator as claimed in any one of claims 1-4, wherein the first corrugation of the first plates has a width which is substantially as great as the pitch.

7. A lamellar separator as claimed in any one of claims 1-4, wherein the corrugation of the second plates has substantially as great width as pitch and has the same width and pitch as the first corrugation of the first plates.

8. A lamellar separator as claimed in claim 6, wherein the corrugation of the second plates has substantially as great width as pitch and has the same width and pitch as the first corrugation of the first plates.

9. A lamellar separator as claimed in claim 2 or 3, wherein the first corrugation of the first plates has a width which is substantially as great as the pitch.

10. A lamellar separator as claimed in claim 9, wherein the first corrugation of the first plates has a pitch of 3 to 50 mm and the second corrugation of the first plates has a pitch of about 1/5 of that of the first corrugation.

* * * * *